2 Sheets—Sheet 1.

G. F. BLAKE,

Assignor to the GEORGE F. BLAKE MANUFACTURING CO.

Duplex Pumping-Engine.

No. 8,585. Reissued Feb. 18, 1879.

Witnesses.

L. F. Connor

Jos. P. Livermore

Inventor.

George F. Blake by Crosby & Gregory

Attys

N. PETERS, PHOTO-LITHOGRAPHER, WASHINGTON, D. C.

G. F. BLAKE,

Assignor to the GEORGE F. BLAKE MANUFACTURING CO.

Duplex Pumping-Engine.

No. 8,585. Reissued Feb. 18, 1879.

Witnesses.

L. F. Connor.

Jos. P. Livermore

Inventor.

George F. Blake by Crosby & Gregory

Atty

N. PETERS, PHOTO-LITHOGRAPHER, WASHINGTON, D. C.

UNITED STATES PATENT OFFICE.

GEORGE F. BLAKE, OF BOSTON, MASSACHUSETTS, ASSIGNOR TO THE GEORGE F. BLAKE MANUFACTURING COMPANY.

IMPROVEMENT IN DUPLEX PUMPING-ENGINES.

Specification forming part of Letters Patent No. 185,888, dated January 2, 1877; Reissue No. 8,585, dated February 18, 1879; application filed December 30, 1878.

*To all whom it may concern:*

Be it known that I, GEORGE F. BLAKE, of Boston, in the State of Massachusetts, have invented certain Improvements in Duplex Pumping-Engines; and I do hereby declare the following to be a full and correct description of the same, reference being had to the accompanying drawings, in which—

Figure 1:
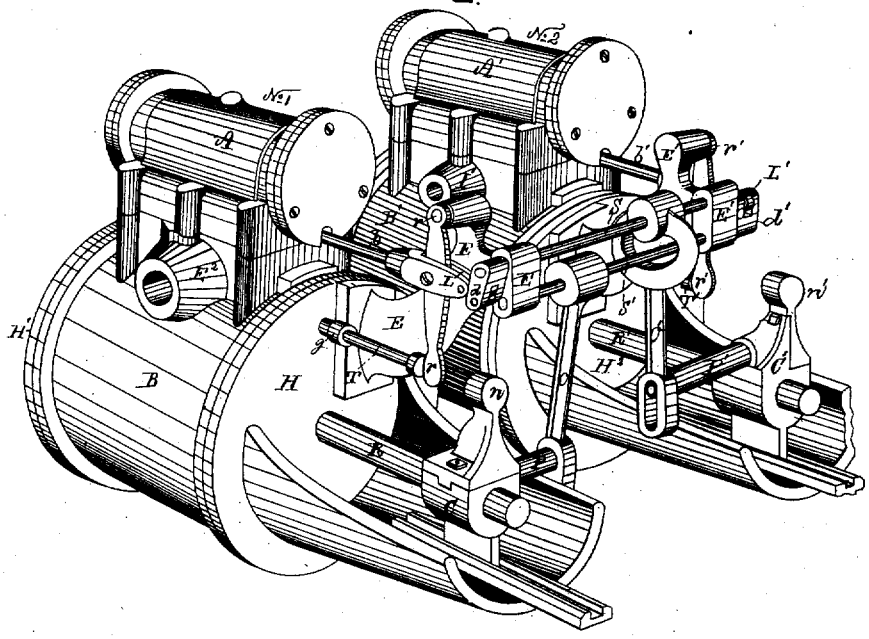
Figure 5:
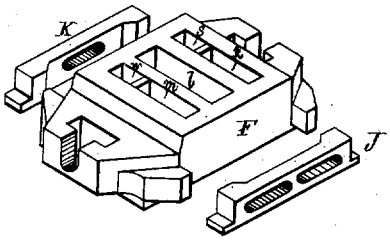
Figure 6:
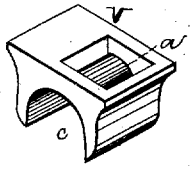
Figure 2:
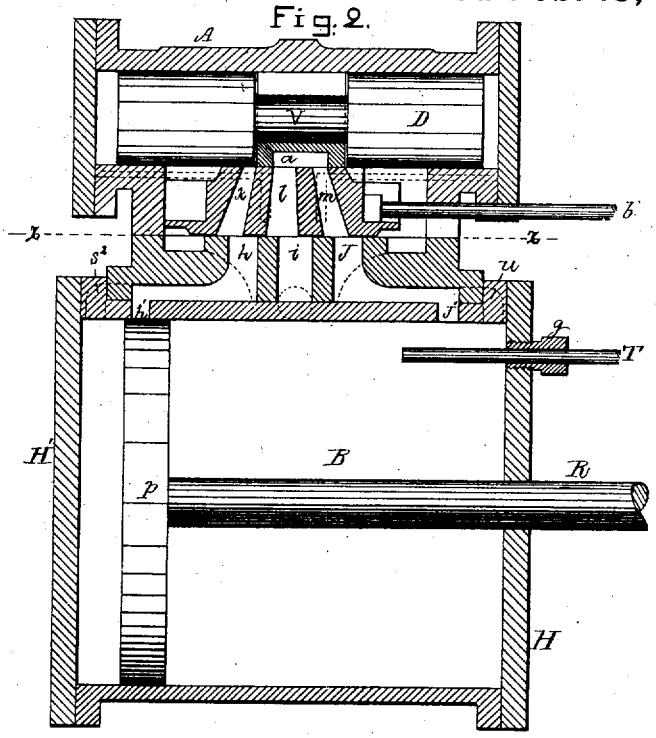
Figure 4:
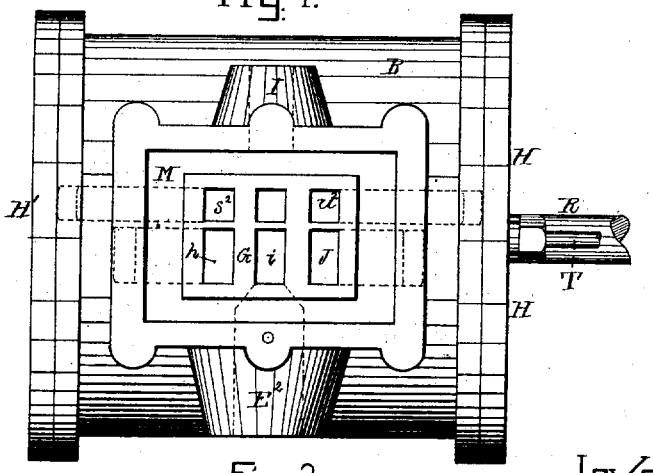
Figure 3:
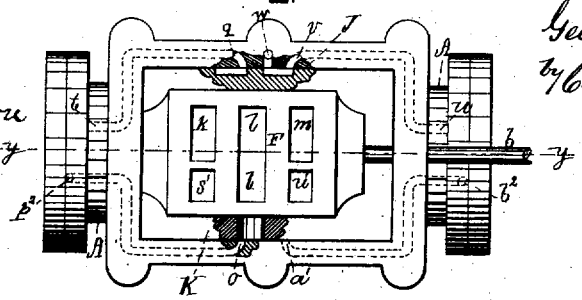

Figure 1 represents, in perspective, a duplex pumping-engine embodying my invention; Fig. 2, a vertical section of the main and auxiliary sections of one of the engines of Fig. 1, showing the system of valves for controlling the passage of steam into and from the main cylinder; Fig. 3, a section on line *z z*, Fig. 2, looking upward; Fig. 4, a like section, looking downward upon the main valve-seat; Fig. 5, a perspective view of the movable seat and induction and eduction valves, and Fig. 6 an inverted view of the main valve.

In water-works for cities and towns, and for clearing mines—places where large quantities of water have to be raised or supplied continuously by pumping—it is usual to employ duplex pumps, which are adapted to maintain a continuous flow of water through the pipes, the valves being operated so as to avoid destructive concussion or shocks in the pipes, which would occur by the use of a single pumping-engine.

The chief object of my invention is to avoid the stoppage of the entire water-supply controlled by the duplex pumping-engines when, for any cause, one of the pumps or engines becomes injured, and in the mechanism hereinafter described the supply of water cannot be wholly cut off so long as one engine remains in working order.

One part of my invention consists in the combination, with two direct-acting pumping-engines and their independent piston-rods, of induction and eduction valves for each engine, and means to operate the said valves of each engine from the piston-rod of its own engine, and also from the piston-rod of the opposite engine, whereby either engine is adapted to actuate its own as well as the induction and eduction valves of the other engine with which it is coupled, or when disconnected from each other to operate as independent engines, substantially as described.

The two engines are combined to operate together in unison, and also so that either engine may be stopped for repairs while the other is continued in operation.

The drawings represent, in Figure 1, two direct-acting pumping-engines, marked, respectively, No. 1 and No. 2, each of which is constructed mainly in accordance with patents heretofore granted to me.

Referring to engine No. 1, A is an auxiliary cylinder, in which reciprocates the auxiliary piston or plunger P, which operates the main valve V.

The inlet and exhaust of cylinder A are controlled by valves moved by the slide or valve rod *b*, which latter derives its motion, in one instance, from a valve-actuating lever, *r*, having its fulcrum or pivot on a bracket, E, shown attached to the head H of cylinder B, engine No. 1, a link, L, connecting the lever *r* and rod *b*. This lever *r* derives its motion in one direction from a tappet-rod, T, impelled by the piston of cylinder B, and in the opposite direction by a tappet-arm, *n*, attached to or moving with its own piston-rod R and cross-head C. In a like manner valve-rod $b^1$ for pump No. 2, connected by link L′ with valve-actuating lever *r*′, pivoted upon bracket E′, is actuated by a tappet-rod, T′, and arm *n*′ of cross-head C′, moving with piston-rod R′ of its own engine.

To operate the valve-rod of each engine from the piston-rod or cross-head of the other engine, I have provided two rock-shafts, S S′, which have their bearings in brackets E E′ of the two cylinders B B′.

The rock-shaft S has an arm, O′, which is engaged and moved by piston-rod R′, cross-head C′, and pin P′ of engine No. 2, and an arm, *d*, at the opposite end of the said shaft, connected by link L with valve-rod *b*, actuates the induction and eduction valves, hereinafter described, of engine No. 1.

Rock-shaft S′ has an arm, O, engaged and turned by piston-rod R, cross-head C, and pin P of engine No. 1, and the shaft S′ at its other end has an arm, *d*′, connected with valve-rod $b^1$ by means of a link, L′, said rock-shaft and its connections thereby operating the induction and eduction valves, to be hereinafter described, of engine No. 2.

When the arms O O′ of the rock-shafts are connected with and so as to be moved by the moving piston-rods and cross-heads, and the arms *d d′* are connected with the valve-rods *b* $b^1$, the engines are considered to be coupled together, and then the tappet-rods T T′ and tappet-arms *n n′* and levers *r r′* are not needed to move the valve-rods, and they are moved out of operative position or from the machine.

The holes in which the tappet-rods work may be covered by means of screw-caps.

If engine No. 1 is to work its own valves, and also the valves of pumping-engine No. 2, the link L (see Fig. 1) is simply disconnected from arm *d* of the rock-shaft S, such disconnection permitting the moving piston R and tappet-arm *n* and tappet-rod T to operate lever *r* and rod *b*, while at the same time the pin P, moved by the same piston R through arm O and rock-shaft S′ and its connections, reciprocates rod $b^1$.

A converse arrangement or connection enables the piston-rod of engine No. 2 to work its own valves and those of No. 1.

When it is desired that each or either engine shall act independently, the links L and L′ are to be disconnected from the rocker-shafts S and S′, respectively; or, if preferred, the levers O O′ may be disconnected from the pins P P′ and their respective cross-heads. In either case the tappet-rods T are again inserted and the tappet-arms *n* replaced.

The tappet-rod T passes through a gland, *g*, into the main cylinder B, (see Fig. 2,) and is driven out by the piston P as it approaches the end of its forward stroke.

The operation of the main and auxiliary valves does not differ essentially from that described in my previous patents and in an application of even date herewith for an improvement in steam-pumps.

The auxiliary cylinder A above the main cylinder B is supplied with live steam to drive the auxiliary piston D by means of the induction-valve K, Fig. 5, and the exhaust from cylinder A is controlled by the eduction-valve J, the said valves co-operating with parts *a′ o* and *q w v*. (See Fig. 3.)

The auxiliary piston reciprocates the main valve V over the movable seat F, which slides upon the main valve-seat G, fixed to cylinder B.

The induction and eduction valves are shown as moved by and with the valve-seat and valve-rod. The valves of each engine are alike.

In Fig. 3 cylinder A is shown taking steam through ports *o* $p^2$ *q t* and exhausting through *u v w*.

The port $b^2$ being nearer to the end of cylinder A than port *u*, the steam between the two is trapped by reason of port *a′* being closed by the face of valve K.

The reverse throw of the valve produces a converse condition of the ports and steam-ways, the cylinder A taking steam through ports *v u a′* $b^2$ and exhausting through ports *t w*, the auxiliary piston D cushioning on steam trapped between ports *t* and $b^2$ by valve K closing port *o*.

The main valve V controls the ports in the movable seat F and fixed valve-seat G, so that the main cylinder B shall, in the position shown in Fig. 2, take steam through ports *k h h′* $s^1$ $s^2$, exhaust-ports *j′ j m a l i*, and the piston at each end of its stroke cushions on steam trapped between port *h′* and the head H′ of cylinder B, or port *j′* and head H, by reason of ports *h* and *u* being alternately covered by the plain surface of valve V.

Having thus fully described my invention, what I claim, and desire to secure by Letters Patent, is—

1. The combination, with two direct-acting pumping-engines and their independent piston-rods, of induction and eduction valves for each engine, and means to operate the said valves of each engine from the piston-rod of its own engine, and also from the piston-rod of the opposite engine, substantially as described, whereby either engine is adapted to actuate its own as well as the induction and eduction valves of the other engine with which it is coupled, or when disconnected from each other to operate as independent engines.

2. The combination, with two direct-acting pumping-engines, of an induction and eduction valve in each engine, and means to actuate the said valves of each of these engines, substantially as described, whereby one engine is enabled from its piston to operate its own valves and the valves of the other engine.

3. The combination, with two pumping-engines, each capable of independent action, of coupling mechanism consisting of rock-shafts, arms thereon set in motion from the pistons and arms, and links to connect the valve-rods with the said shafts, to operate substantially as described.

4. The movable seat and the induction and eduction valves reciprocated with it, the latter being adapted to control the ingress and egress of steam to operate the auxiliary piston in the auxiliary cylinder and the main valve, substantially as described.

GEO. F. BLAKE.

Witnesses:
GEO. W. GREGORY,
L. F. CONNOR.